(12) United States Patent
Cho et al.

(10) Patent No.: US 12,178,218 B2
(45) Date of Patent: Dec. 31, 2024

(54) METHOD FOR PRODUCING FOOD MATERIAL, AND FOOD MATERIAL

(71) Applicant: CJ CHEILJEDANG CORPORATION, Seoul (KR)

(72) Inventors: Won Il Cho, Seoul (KR); Seung Chul Kim, Hwaseong-si (KR); Sang Eun Yoon, Cheongju-si (KR); Nam Ju Lee, Seoul (KR); Jong Il Lee, Seoul (KR); Dae Ik Kang, Goyang-si (KR); Tae Hyeong Kim, Suwon-si (KR)

(73) Assignee: CI CHEILJEDANG CORPORATION, Seoul (KR)

( * ) Notice: Subject to any disclaimer, the term of this patent is extended or adjusted under 35 U.S.C. 154(b) by 913 days.

(21) Appl. No.: 16/476,639

(22) PCT Filed: Jan. 9, 2018

(86) PCT No.: PCT/KR2018/000426
§ 371 (c)(1),
(2) Date: Jul. 9, 2019

(87) PCT Pub. No.: WO2018/128525
PCT Pub. Date: Jul. 12, 2018

(65) Prior Publication Data
US 2019/0350213 A1   Nov. 21, 2019

(30) Foreign Application Priority Data

Jan. 9, 2017   (KR) .................. 10-2017-0002787
Jan. 9, 2018   (KR) .................. 10-2018-0002800

(51) Int. Cl.
  *A23B 4/027*   (2006.01)
  *A23B 4/005*   (2006.01)
  (Continued)

(52) U.S. Cl.
  CPC .............. *A23B 4/027* (2013.01); *A23B 4/005* (2013.01); *A23L 13/72* (2016.08); *A23L 17/00* (2016.08)

(58) Field of Classification Search
  CPC ........ A23L 13/426; A23L 13/50; A23L 13/70; A23L 29/294; A23L 29/212;
  (Continued)

(56) References Cited

U.S. PATENT DOCUMENTS 7,128,939 B2    10/2006   Watanabe et al.
2005/0058765 A1   3/2005   Watanabe et al.
2006/0292269 A1  12/2006   Yamada et al.

FOREIGN PATENT DOCUMENTS

CN   1649516 A   8/2005
CN   1891080 A   1/2007
(Continued)

OTHER PUBLICATIONS

Arayama et al JP-2010011819-A Jan. 21, 2010 (Year: 2010).*

(Continued)

*Primary Examiner* — Vera Stulii
(74) *Attorney, Agent, or Firm* — Renner, Otto, Boisselle & Sklar, LLP.

(57) ABSTRACT

The present application relates to a method for producing food material for retorting, and to food material for retorting produced by the method, the method comprising: a curing step for mixing one or more base material, selected from the group consisting of meat and seafood, with a curing agent containing phosphate and starch, and curing; and a step for heating and sterilizing the base material by heating at the temperature of 110-130° C. for 10-60 minutes.

3 Claims, 2 Drawing Sheets

(51) Int. Cl.
*A23L 13/72* (2023.01)
*A23L 17/00* (2016.01)

(58) Field of Classification Search
CPC ....... A23L 13/432; A23L 17/00; A23B 4/027; A23B 4/005; A23B 4/0056
See application file for complete search history.

(56) References Cited

FOREIGN PATENT DOCUMENTS

| | | |
|---|---|---|
| CN | 103687501 A | 3/2014 |
| CN | 104023564 A | 9/2014 |
| CN | 104106816 A | 10/2014 |
| JP | 2007-006724 A | 1/2007 |
| JP | 2009-240210 A | 10/2009 |
| JP | 2010-011819 A | 1/2010 |
| JP | 2012-157291 A | 8/2012 |
| JP | 5145471 B1 | 2/2013 |
| KR | 2003-0000221 A | 1/2003 |
| KR | 10-1082481 B | 11/2011 |
| KR | 2013-0009471 A | 1/2013 |
| KR | 2013-0021583 A | 3/2013 |
| KR | 2016-0049310 A | 5/2016 |
| SU | 1338832 A1 | 9/1987 |
| WO | 2003/090564 A1 | 11/2003 |
| WO | 2009-123333 A1 | 10/2009 |
| WO | 2013/015401 A1 | 1/2013 |

OTHER PUBLICATIONS

International Search Report and Written Opinion for corresponding Patent Application No. PCT/KR2018/000426 dated Apr. 30, 2018.

Grace Young, "Velvet Stir-Fry: Luscious and Light—Book extract", XP055696574, p. 100-101 and "Fujianese-Style Stir-Fried Fish with Peppers—Book extract", XP055696601, p. 176 (both in: "Stir-Frying to the Sky's Edge: The Ultimate Guide to Mastery, with Authentic Recipes and Stories", May 4, 2010, Simon and Schuster, New York, ISBN: 978-1-4165-8057-7).

Original and English Summary of Chinese Office Action issued for corresponding Chinese Application No. 201880006298.3 filed Jul. 9, 2019.

Collection of Science and Technology, Edited by Yunnan Science and Technology Academic Exchange Center, Atomic Energy Press, Jul. 31, 2007, page 82 (together with the English translation of the part cited in the Office Action).

Fu Xiong et al., "Modified Starch in Food", China Light Industry Press, Mar. 31, 2016, p. 195 (together with the English translation).

Dong Quan et al., "Food Processing and Logistics Safety Controls", China Quality and Standard Press, Jan. 31, 2013, p. 168 (together with the English translation).

"Domesticated Animal Product Processing", Edited by Hangzhou Agricultural School, Zhejiang Province, Agricultural Press, Oct. 31, 1993, p. 38 (together with the English translation).

Zhou Jie et al., "Effects of Processing Factors and Formulating on Quality of Meatball", Meat Research, vol. 9, Sep. 30, 2009, pp. 28-33 (together with the English abstract).

Hao Juan et al., "Effect of mixed phosphate, soybean protein isolate and starch on comprehensive quality of chicken sausage", Meat Industry, vol. 11, Nov. 30, 2010, pp. 18-23 (together with the English abstract).

Zhou Ya-jun et al., "Study on processing characteristics of restructured pork and chicken", Journal of Jilin University (Engineering and Technology Edition), vol. 42, Dec. 31, 2012, pp. 454-457 (together with the English abstract).

\* cited by examiner

METHOD FOR PRODUCING FOOD MATERIAL, AND FOOD MATERIAL

TECHNICAL FIELD

The present application relates to a method for producing food material and food material.

BACKGROUND ART

Meat such as beef, pork, and chicken, and seafood such as shrimp, squid, octopus, and clam meat are used as important food ingredients in the field of processed foods.

However, these food materials are subject to thermal denaturation of tissue proteins after a step of high-temperature high-pressure sterilization such as retort, resulting in a decrease of water holding capacity. Water holding capacity refers to the ability of a food material to retain water within tissue without loss during a physical process such as fine cutting, compression, and heat treatment, and when the water holding capacity is reduced, the quality is damaged and thus the texture is deteriorated.

Since the deterioration of texture leads to a decrease in consumer preference, to overcome this problem, attempts have been made to use raw meat and seafood as food materials in small amounts or in small sizes. However, this is only a short-term solution and could not be served as a fundamental solution to the decrease in water holding capacity in the processing of food materials.

Meanwhile, water holding capacity is important from the aspect of ease in processing as well as from the aspect of texture. As can be seen in that the conventional production of meat-based processed foods such as hams, sausages, etc. requires additional absorption or binding of additive water, which corresponds to about 25-50% of the meat volume other than water within the meat protein itself, it is considered that the water holding capacity of a food material is very important and when the water holding capacity is low, there is a problem of cost increase due to decrease in yield.

The factors affecting the water holding capacity of these food materials may include base materials' freshness, protein contents, concentrations of salt and phosphate used as curing agents, temperature of heat treatment, time, etc. Specifically, as disclosed in KR Patent Laid-Open Publication No. 2003-0000221, currently, a commercially used method for improving the water holding capacity of food materials may include a curing method using a curing solution containing sodium tripolyphosphate (a curing method using complex phosphate composed of polyphosphate, pyrophosphate, and metaphosphate). The use of such a method has been restricted to be mainly used only in the production of meat products such as ham, meat, and fish sausages, and there are few studies and commercialization techniques to improve the water holding capacity to improve the tough texture when heating and storing high-pressure, high-temperature sterilized food materials such as retort. Accordingly, the inventors of the present application have focused the studies on the production method of food materials capable of maintaining the water holding capacity applicable even in the process of producing foods heated at high temperature and thereby has established a method of producing the commercially applicable food material of the present application.

[Patent Document 1]
  (Patent Document 1) KR Patent Laid-Open Publication No. 2003-0000221 (publication date: Jan. 6, 2003).

DISCLOSURE OF THE INVENTION

Technical Problem

An aspect of the present application provides a method for producing a food material, which comprises: a curing step for mixing one or more base material selected from the group consisting of meat and seafood with a curing agent comprising phosphate and starch, and curing; and a sterilization step for sterilizing the base material by heating at a temperature of 110-130° C. for 10-60 minutes.

Additionally, another aspect of the present application provides a food material produced by the following steps of: a curing step for mixing one or more base material selected from the group consisting of meat and seafood with a curing agent comprising phosphate and starch, and curing; and a sterilization step for sterilizing the base material by heating at a temperature of 110-130° C. for 10-60 minutes.

Technical Solution

To achieve the above objects, the present application provides a method for producing a food material for retorting, comprising: a curing step for mixing one or more base material selected from the group consisting of meat and seafood with a curing agent comprising phosphate and starch, and curing; and a sterilization step for sterilizing the base material by heating at a temperature of 110-130° C. for 10-60 minutes.

The base material may be one or more meats selected from chicken, duck, pork, beef, and lamb; and one or more seafoods selected from squid, octopus, small octopus, shrimp, crab, clam meat, and fish (such as cod, pollack, yellow corbina, mackerel, spanish mackerel, and saury), but the base material are not limited thereto.

The present application can produce a food material with a soft texture for retorting, which has higher water holding capacity (i.e., a high content of meat juice) compared to food material treated with phosphate and starch, respectively, using a curing agent comprising both phosphate and starch, and additionally, has significantly improved the property of a food material the hardness of which is increased at the time of heating at high temperature.

Specifically, the phosphate maintains the water holding capacity of food materials and improves the yield thus having an effect of improving a texture and a yield even at high temperature heating (retort). Specifically, the phosphate may comprise one or more selected from polyphosphate, pyrophosphate and metaphosphate, glycerophosphate, aluminum phosphate, etc. In addition, the starch and a sweetener increase the water holding capacity of food material thus having the effect of minimizing a hardening phenomenon of tissue that occurs as a result of water separation within the proteins of a food material. In particular, the starch has the effect of maintaining water holding capacity in food materials by gelatinization. The starch may comprise one or more selected from rice starch, wheat starch, corn starch, sweet potato starch, potato starch, tapioca starch, indigestible dextrin, indigestible maltodextrin, denatured starch, etc.

The phosphate may be used in an amount of 0.01-0.9 wt % (w/w), specifically 0.02-0.87 wt % (w/w), more specifically 0.03-0.85 wt % (w/w), and most specifically 0.05-0.8 wt % (w/w) relative to the weight of the base material. In addition, the starch may be used in an amount of 0.05-2.0 wt % (w/w), specifically 0.07-1.8 wt % (w/w), more specifically 0.08-1.7 wt % (w/w), even more specifically 0.1-1.5 wt % (w/w), and most specifically 0.05-0.8 wt % (w/w) relative to the weight of the base material.

The curing step may be performed using a curing agent in an amount of 0.05-1.5 wt % (w/w) relative to the weight of the base material at a temperature of 3-15° C. for 1-13 hours, specifically using a curing agent in an amount of 0.07-1.3 wt % (w/w) relative to the weight of the base material at a temperature of 4-13° C. for 1 hour 20 minutes to 12 hours 40 minutes, more specifically using a curing agent in an amount of 0.09-1.1 wt % (w/w) relative to the weight of the base material at a temperature of 4.5-11° C. for 1 hour 40 minutes to 12 hours 20 minutes, and most specifically using a curing agent in an amount of 0.1-1.0 wt % (w/w) relative to the weight of the base material at a temperature of 5-10° C. for 2-hours. In addition, the curing step may be performed using a known curing method, but the curing may be performed using injection or vacuum tumbling curing.

Additionally, in the curing agent, complex phosphate and starch may be contained in a weight ratio of 5:5 to 2:8, specifically 5:5 to 3:7, and more specifically 3:7. In the above range, food material in which hardness can be maintained at a low level and water holding capacity is high can be prepared.

The curing agent may further comprise other additives as necessary, and specifically, the curing agent may further comprise edible baking soda, a sweetener, an oil, etc. Specifically, the edible baking soda has the effect of softening the tissue of food material, and may be one or more selected from sodium hydrogen carbonate and sodium bicarbonate. As the sweetener, a known sweetener (e.g., disaccharides, oligosaccharides, sugar alcohol, high intensity sweeteners, and liquid sugar) may be included without limitation. The disaccharide may comprise trehalose. The oil has the effect of maintaining a soft texture during heat treatment and storage of food material, and specifically, may comprise one or more selected from soy bean oil, olive oil, palm oil, corn oil, palm olein oil, palm stearin oil, coconut oil, canola oil, and sunflower oil, and hardened oil thereof.

The edible baking soda may be used in an amount of 0.01-0.9 wt % (w/w), specifically 0.02-0.87 wt % (w/w), more specifically 0.03-0.85 wt % (w/w), and most specifically 0.05-0.8 wt % (w/w), relative to the weight of the base material. The sweetener may be used in an amount of 0.05-2.0 wt % (w/w), 0.07-1.8 wt % (w/w), more specifically 0.08-1.7 wt % (w/w), and most specifically 0.1-1.5 wt % (w/w), relative to the weight of the base material. Additionally, the oil may be used in an amount of 0.05-2.0 wt % (w/w), 0.07-1.8 wt % (w/w), more specifically 0.08-1.7 wt % (w/w), and most specifically 0.1-1.5 wt % (w/w), relative to the weight of the base material.

The method for producing a food material including the curing step have an effect of improving the texture of the base material by maintaining the water holding capacity of a food material and improving the yield of a product by increasing the ease of processing compared to the conventional production method.

Additionally, the production method of the present application, after the curing step, may further comprise a blanching step in which the base material is blanched by one or more methods among a two-step blanching via sequential heating at low temperature and high temperature, oil blanching, and steam blanching.

Specifically, while the conventional blanching has a problem in that heating meat and seafood for long hours in hot water can cause them to have a tough texture, in a case of the two-step blanching, the two-step blanching performs the blanching in two divided steps and thus the tissue shrinkage rate of meat and seafood can be maximally delayed and the shrinkage of protein tissue occurs slowly thereby improving the texture and yield. Additionally, in a case of oil blanching, the instant heating at high temperature causes the hardening of the surface protein within a short period of time, and thus meat juice can be preserved thus enabling the implementation of a smooth texture, whereas in a case of steam blanching, it is possible to perform heating within a shorter period of time at higher temperature compared to the conventional blanching and has many advantages from the aspect of a juicy texture due to retention of meat juice, etc.

Specifically, the two-step blanching may be performed such that primary blanching is performed in water at 60-90° C. for 2 to 12 minutes, followed by secondary blanching in water at 90-110° C. for 30 seconds to 12 minutes, and specifically primary blanching in water at 70-80° C. for 3 to 10 minutes, followed by secondary blanching in water at 95-100° C. for 1 to 10 minutes. More specifically, the two-step blanching may be performed by adding edible baking soda in an amount of 0.05-0.8 wt % (w/w), and specifically 0.1-0.5 wt % (w/w) relative to the weight of water.

Additionally, the oil blanching may be performed 110-150° C. for 20-100 seconds using one or more oils selected from corn oil, soybean oil, and grape seed oil, and specifically at 120-140° C. for 30-90 seconds using corn oil.

Additionally, the steam blanching may be performed with steam at 85-110° C. for 20-100 seconds, and specifically with steam at 90-105° C. for 30-90 seconds.

Specifically, when the oil blanching and the steam blanching are performed in the above temperature range, the effect of surface coating by the instant thermal denaturation of the surface protein that reduces the loss of internal meat juice (water content) is sufficiently maintained and thus the effect of improving the mechanical hardness is excellent. Although these blanching methods cause thermal denaturation of the surface, they can prevent quality deterioration caused by browning of the meat surface due to high temperature. Additionally, not only they have an effect of instant thermal denaturation of surface proteins, but also can fully heat the inside of meat, and thus the loss of meat juice can be minimized thereby being capable of improving the texture of the meat.

After the blanching step, a step for cooling in which the base material is cooled until the central temperature reaches 50-65° C. may be included.

Meanwhile, after the blanching step, one or more cooling methods selected from cooling in the air or cold water shower-style cooling.

The sterilization step is to subject the base material, which has undergone the curing step, to retort sterilization, for example, heating at 110-130° C., specifically at 115-125° C., and more specifically at 121° C., for 10-60 minutes, specifically for 20-40 minutes, and more specifically for 30 minutes. The sterilization step is to improve the microbial stability of a produced food material so as to maintain the quality of the food material in manufacture, distribution, storage, etc. In a case of the conventional retort sterilization, after sterilization, the quality of the food material, in particular hardness becomes high and the water loss rate becomes high thus causing deterioration of the texture. However, the present application can produce a food material with high microbial stability while maintaining the texture of the base material, although the food material undergoes a retort process via the curing step and the blanching step.

Additionally, another aspect of the present application provides a food material for retorting, which is produced by: a curing step for mixing one or more base material selected from the group consisting of meat and seafood with a curing agent comprising phosphate and starch, followed by curing; and a sterilization step for sterilizing the base material by heating at a temperature of 110-130° C. for 10-60 minutes.

Those associated with the production method may be applied to the food material for retorting in the same manner.

The above food material can maintain water holding capacity and has reduced tissue shrinkage caused by heating even when applied to a production process under high temperature heating, and can provide the effects of ease of processing and improved texture when applied to high temperature heating.

Advantageous Effects

According to the method of producing a food material of the present application, the method of the present application has the following effects compared to the conventional production methods of food materials: the method can be applied to the process of producing foods heated at high temperature; can maintain water holding capacity of a food material during the process of producing foods heated at high temperature; can improve the texture of a product by reducing the shrinkage of the tissue caused by heating; and can improve the yield of a product by increasing the ease of processing.

MODE FOR CARRYING OUT THE INVENTION

Figure 1:
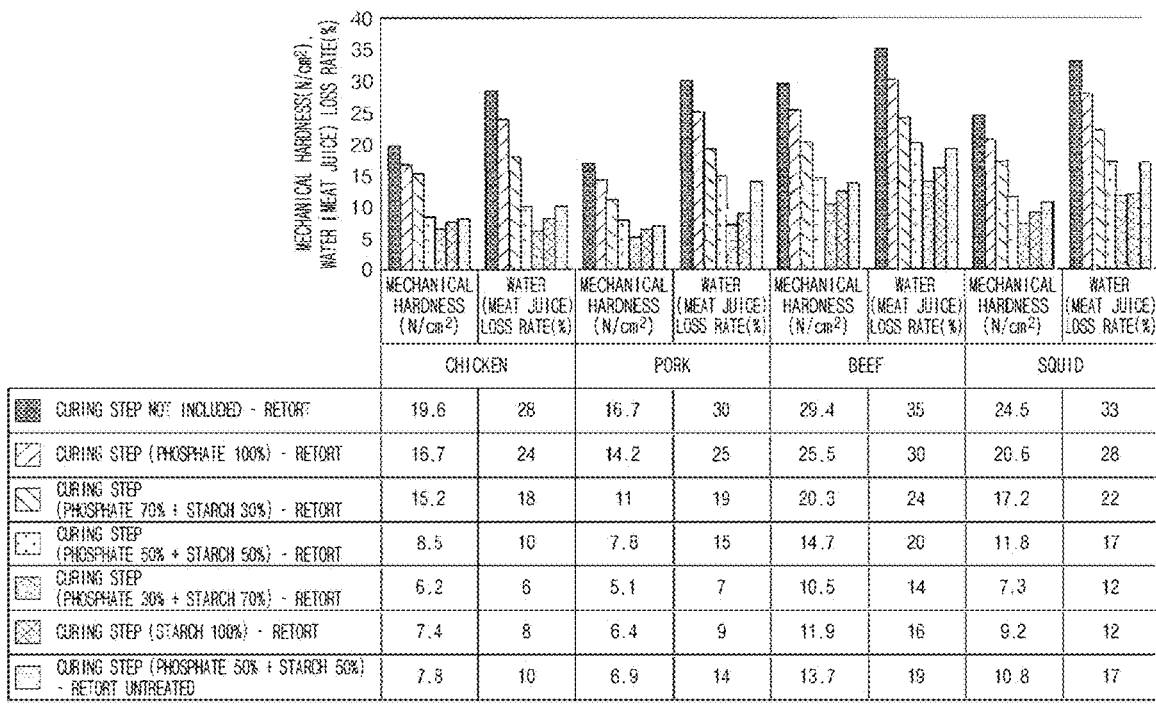
FIG. 1 is a graph showing the results of hardness and water loss rate of a food material according to curing conditions.

Hereinafter, the present invention will be described in more detail to allow for a clearer understanding of the present invention. However, the following examples are provided for easier understanding of the present application, and the present application is not limited to the following examples.

EXAMPLES

Preparation Example 1: Method of Pretreating Raw Meat and Seafood for Texture Improvement by Application of Food Additive Curing and New Blanching Process The representative production process of heated meat and seafood for texture improvement by the application of a food additive curing and new blanching process of the present application is as follows.

(1) Processes of Sorting Raw Material, Washing, and Fine Cutting

In order to remove contaminants (e.g., dust and foreign substances) attached to the surface of base material such as meat (e.g., beef, pork, and chicken), poultry, shellfish, mollusks (e.g., shrimp, squid, and small octopus), etc., they were washed first with clean water and then cut to prepare as base materials.

(2) Curing Process

To the base materials which had undergone selection, washing, and cutting were added each of complex phosphate, edible baking soda, modified starch, trehalose, and cooking oil in an amount of 0.1-1.0% (w/w) alone or in combination relative to the total weight, considering the target level of texture, and stored in a refrigerated state at 5° C. for 12 hours.

(3) Blanching Process (Two-Step Blanching, Oil Blanching, and Steam Blanching)

The base materials which had undergone the curing step were subjected to a blanching process (a two-step blanching, oil blanching, and steam blanching heating), and thereby a protein state in which tissue can be softened even after high-temperature heating was constituted.

In a case where a two-step blanching was applied, the base materials were added to water or a solution, in which edible baking soda was added in an amount of 0.3% (w/w) relative to the weight of water, and subjected to a sequential heating condition of low and high temperature heating, in which the mixture was heated in water at 75° C. for 7 minutes followed by heating at 95° C. for 3 minutes.

In a case where oil blanching was applied, the base materials were added to a cooking oil at about 130° C. and subjected to blanching heating for about 60 seconds.

In a case where steam blanching was applied, the base materials were heated with steam at 100° C. for 90 seconds.

After the blanching treatment, the base materials were subjected to a cold water shower until the central temperature of the base materials reached about 55° C.

(4) Packaging and Heat Sterilization (Retort, Etc.)

The base materials which had undergone curing and blanching were each cooked by heating after mixing with other solid base materials (e.g., vegetables, etc.) and various kinds of sauces (e.g., Korean, Western, Japanese, Chinese styles, etc.) according to the menu, and then packaged as a finished product into a heat-resistant pouch or tray packaging material for retort made of a multi-layered packaging material, which consisted of polypropylene, aluminum, nylon, etc. having heat resistance to high temperature, a light- and oxygen blocking property, and flexibility, in an amount of 200-500 g, subjected to heat sterilization at 90-121° C. for 10-60 minutes, and prepared into processed foods that can be distributed refrigerated or at room temperature.

Experimental Example 1: Confirmation of Effects of Curing Step

To confirm the effects of the curing step of the present application on base materials of meat and seafood, the curing step was performed/not performed under the conditions described in Table 1 according to the production method of Preparation Example 1. The mechanical hardness and the water loss rate of the prepared food materials are shown in Table 1 and FIG. 1.

TABLE 1

Confirmation of effects of curing step

| Method of Base Material Treatment | Chicken | | Pork | | Beef | | Squid | |
|---|---|---|---|---|---|---|---|---|
| | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) |
| Curing Step Not Included – Retort | 19.60 | 28.00 | 16.70 | 30.00 | 29.40 | 35.00 | 24.50 | 33.00 |
| Curing Step (Phosphate 100%) – Retort | 16.70 | 24.00 | 14.20 | 25.00 | 25.50 | 30.00 | 20.60 | 28.00 |
| Curing Step (Phosphate 70% + Starch 30%) – Retort | 15.20 | 18.00 | 11.00 | 19.00 | 20.30 | 24.00 | 17.20 | 22.00 |
| Curing Step (Phosphate 50% + Starch 50%) – Retort | 8.50 | 10.00 | 7.80 | 15.00 | 14.70 | 20.00 | 11.80 | 17.00 |
| Curing Step (Phosphate 30% + Starch 70%) – Retort | 6.20 | 6.00 | 5.10 | 7.00 | 10.50 | 14.00 | 7.30 | 12.00 |
| Curing Step (starch 100%) – retort | 7.40 | 8.00 | 6.40 | 9.00 | 11.90 | 16.00 | 9.20 | 12.00 |
| Curing Step (Phosphate 50% + Starch 50%) – Retort Untreated | 7.80 | 10.00 | 6.90 | 14.00 | 13.70 | 19.00 | 10.80 | 17.00 |

As can be confirmed in Table 1 and FIG. 1, when the curing step of the present application was included for all of the base materials, compared to the food materials which had undergone retort without a curing step, it was confirmed that the mechanical hardness was decreased and the water loss rate was reduced thereby improving the texture. In particular, when the curing was performed by mixing phosphate with starch instead of using phosphate alone, the mechanical hardness and water loss rate were further improved and thus the texture at a level similar to the mechanical hardness and water loss rate before the retort treatment were achieved thereby being capable of maintaining the texture of base materials even at the time of retort sterilization for mass production.

Additionally, when the curing was performed by mixing phosphate (30%) and starch (70%), the mechanical hardness was decreased by about 63% and the water loss rate was decreased by about 64%. Therefore, it was confirmed that the curing step where phosphate (30%) and starch (70%) were mixed and used as a curing agent showed the most excellent texture improving effect.

Experimental Example 2: Confirmation of Effects of Blanching Step (1) Confirmation of Effects of Blanching To confirm the effects of the blanching step of the present application on base materials of meat and seafood, the blanching step was performed/not performed under the conditions described in Table 2 according to the production method of Preparation Example 1. The mechanical hardness and the water loss rate of the prepared food materials are shown in Table 2 and FIG. 2.

TABLE 2

Confirmation of effects of blanching step

| Method of Base Material Treatment | Chicken | | Pork | | Beef | | Squid | |
|---|---|---|---|---|---|---|---|---|
| | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) |
| 1) Blanching Untreated – Retort | 21.0 | 31 | 18.5 | 34 | 31.8 | 37 | 25.9 | 34 |
| 2) Existing Blanching (Heating in Water for Long Hours) – Retort | 19.1 | 29 | 17.4 | 30 | 27.5 | 34 | 24.1 | 31 |
| 3) Two-step Blanching (Low Temperature Hot Water → High Temperature Hot Water) – Retort | 15.7 | 24 | 13.9 | 25 | 24.5 | 27 | 21.9 | 26 |
| 4) Surface Blanching (Steam) – Retort | 13.0 | 20 | 11.7 | 20 | 21.0 | 23 | 18.5 | 22 |
| 5) Surface Blanching (Oil) – Retort | 9.8 | 17 | 8.2 | 16 | 19.4 | 20 | 15.7 | 19 |

Figure 2:
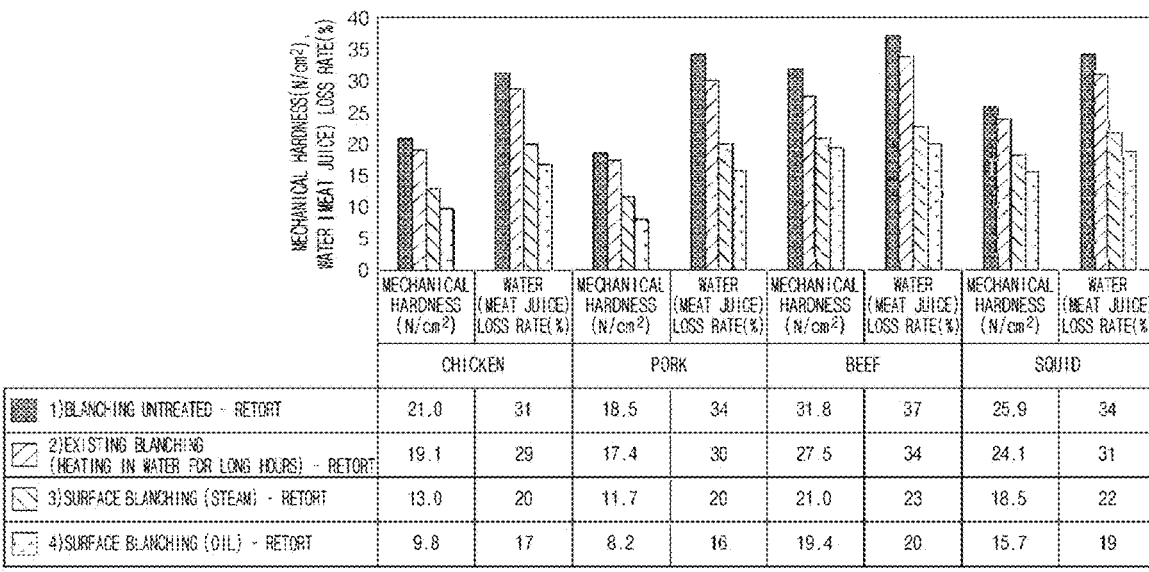
FIG. 2 is a graph showing the results of hardness and water loss rate of a food material according to a blanching step.

As can be confirmed in Table 2 and FIG. 2, when the blanching step of the present application was included for all of the base materials, compared to the food materials which had undergone retort without a blanching step, it was confirmed that the mechanical hardness and the water loss rate were reduced thereby improving the texture. In particular, compared to the existing blanching, when the two-step blanching and surface blanching (steam and oil) were performed, it was confirmed that the mechanical hardness and water loss rate were decreased thereby further improving the texture.

(2) Confirmation of Conditions for Optimal Blanching

Through the above experiment, it was confirmed that the blanching step of the present application had a texture-improving effect. To confirm the blanching conditions (temperature and time) showing the most excellent effect, the blanching step was performed under the conditions described in Table 3 according to the production method of Preparation Example 1. The mechanical hardness and the water loss rate of the prepared food materials are shown in Table 3 and FIG. 3.

TABLE 3

Confirmation of optimal blanching

| Method of Base Material Treatment | Chicken | | Pork | | Beef | | Squid | |
| --- | --- | --- | --- | --- | --- | --- | --- | --- |
| | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) |
| 1) Two-Step Blanching (75° C., 7 Min → 95° C., 3 Min) | 15.7 | 24 | 13.9 | 25 | 24.5 | 27 | 21.9 | 26 |
| 2) Surface Blanching (Steam, 100° C., 30 Sec) – Retort | 13.0 | 20 | 11.7 | 20 | 21.0 | 23 | 18.5 | 22 |
| 3) Surface Blanching (Steam, 100° C., 1 Min 30 Sec) – Retort | 14.5 | 24 | 9.1 | 18 | 17.3 | 21 | 20.0 | 24 |
| 4) Surface Blanching (Oil, 130° C., 30 Sec) – Retort | 9.8 | 17 | 8.2 | 16 | 19.4 | 20 | 15.7 | 19 |
| 5) Surface Blanching (Oil, 130° C., 1 Min 30 Sec) – Retort | 11.5 | 19 | 7.4 | 13 | 15.1 | 17 | 17.3 | 20 |

Figure 3:
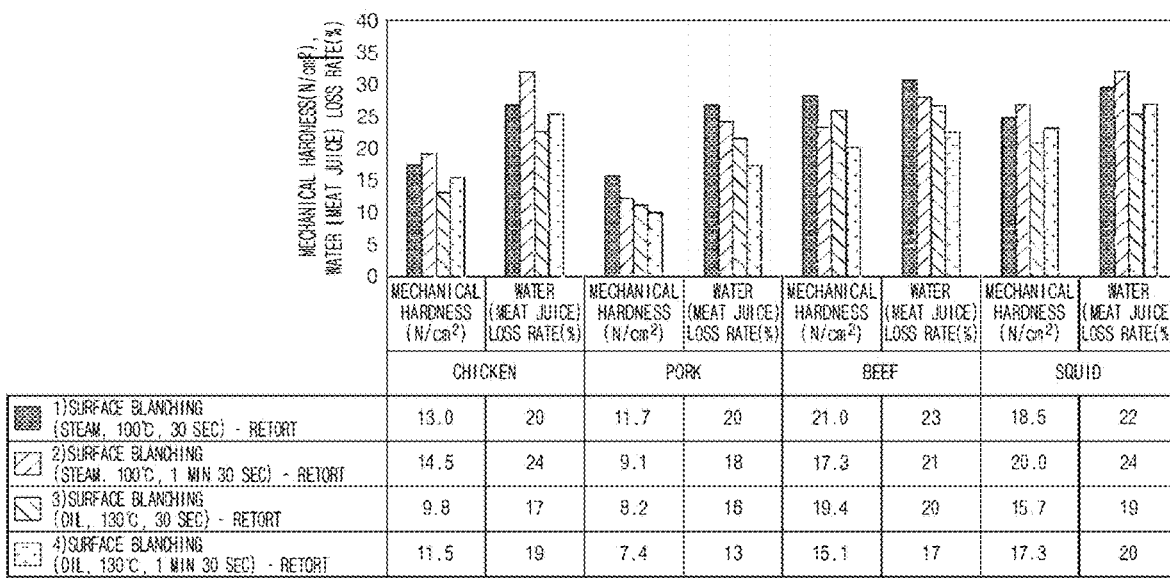
FIG. 3 is a graph showing the results of hardness and water loss rate of a food material according to blanching conditions.

As can be confirmed in Table 3 and FIG. 3, it was confirmed that in order to have an optimal texture through low mechanical hardness (associated with a soft meat texture) and minimization of water loss rate (associated with the amount of meat juice retention), it is preferred that the two-step blanching be performed at 75° C. for 7 minutes followed by at 95° C. for 3 minutes, whereas the steam blanching be performed at 100° C. for 30 seconds and the oil blanching be performed at 130° C. for 30 seconds.

Experimental Example 3: Confirmation of the Effect of the Preparation Method of the Present Application To confirm the texture-improving effect of the production method of the present application through the curing step and the blanching step of the present application, the curing step and the blanching step were performed under the conditions described in Table 4 based on the production method of Preparation Example 1. The mechanical hardness and the water loss rate of the prepared food materials are shown in Table 4 below.

TABLE 4

Confirmation of the effect of the production method of the present application

| Method of Base Material Treatment | Chicken | | Pork | | Beef | | Squid | |
|---|---|---|---|---|---|---|---|---|
| | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) | Mechanical Hardness (N/cm$^2$) | Water (Meat Juice) Loss Rate (%) |
| 1) Curing and Blanching Untreated – Retort | 21.0 | 31 | 17.5 | 34 | 31.8 | 37 | 25.9 | 34 |
| 2) Curing (Phosphate 100%) – Existing Blanching – Retort | 16.7 | 24 | 14.2 | 25 | 25.5 | 30 | 20.6 | 28 |
| 3) Curing (Phosphate 30% + Starch 70%) + Surface Blanching (oil) – Retort | 4.9 | 4 | 3.7 | 3 | 7.0 | 11 | 5.2 | 9 |

As can be confirmed in Table 4, when the curing step and the blanching step of the present application were performed for all of the food materials, compared to the food materials which had undergone retort without the curing step and the blanching step, it was confirmed that the mechanical hardness and the water loss rate were reduced thereby having a texture-improving effect.

However, it was confirmed that the food material which had undergone the curing (phosphate 30%+starch 70%) and the surface blanching (oil) of the present application showed that the mechanical hardness was decreased by about 73% and the water loss rate was decreased by about 76% thereby implementing a significantly smooth texture.

The invention claimed is:

1. A method for producing food material for retorting, comprising:
   a curing step for mixing one or more base material selected from the group consisting of meat and seafood with a curing agent comprising phosphate and starch, and curing using the curing agent in an amount of 0.05-1.5 wt % (w/w) relative to the weight of the base material;
   a blanching step for blanching the base material by oil blanching; and
   a sterilization step for sterilizing the base material by heating at a temperature of 110-130° C. for 10-60 minutes,
   wherein the curing agent comprises complex phosphate and starch contained in a weight ratio of 5:5 to 3:7,
   wherein the oil blanching is performed in oil at a temperature of 110-150° C. for 20-100 seconds.

2. The method of claim 1, wherein the curing step comprises curing at a temperature of 3-15° C. for 1-13 hours.

3. The method of claim 1, wherein the base material of meat is one or more selected from pork, beef, chicken, duck, turkey, and lamb; and
   the base material of seafood is one or more selected from fishes including squid, octopus, small octopus, shrimp, crab, clam meat and fish such as cod, pollack, yellow corbina, mackerel, spanish mackerel, and saury.

* * * * *

UNITED STATES PATENT AND TRADEMARK OFFICE
CERTIFICATE OF CORRECTION

PATENT NO. : 12,178,218 B2  
APPLICATION NO. : 16/476639  
DATED : December 31, 2024  
INVENTOR(S) : Won Il Cho et al.

Page 1 of 1

It is certified that error appears in the above-identified patent and that said Letters Patent is hereby corrected as shown below:

On the Title Page

Item (73) Assignee should read: CJ CHEILJEDANG CORPORATION, Seoul (KR)

Signed and Sealed this  
Eleventh Day of February, 2025

Coke Morgan Stewart  
*Acting Director of the United States Patent and Trademark Office*